UNITED STATES PATENT OFFICE.

JOSEF MESSINGER AND GEORG VORTMANN, OF AIX-LA-CHAPELLE, ASSIGNORS TO THE FARBENFABRIKEN, VORMALS FR. BAYER & CO., OF ELBERFELD, GERMANY.

SUBSTITUTE FOR IODOFORM.

SPECIFICATION forming part of Letters Patent No. 436,250, dated September 9, 1890.

Application filed February 5, 1890. Serial No. 339,321. (Specimens.) Patented in Germany March 9, 1889, No. 49,739.

*To all whom it may concern:*

Be it known that we, JOSEF MESSINGER and GEORG VORTMANN, chemists, residing at Aix-la-Chapelle, Germany, subjects of the Emperor of Austria-Hungary, have invented a new and useful Improvement in the Manufacture of a New Pharmaceutical Product, (for which we have already obtained Letters Patent in Germany, No. 49,739, dated March 9, 1889,) of which the following is a specification.

Our invention relates to the manufacture of a new iodine substitution product of salicylic acid.

This new medicinal preparation is applicable as a substitute for iodoform wherever the same has been hitherto used in medical practice. It is, however, much superior to that, being odorless and having a higher specific action in numerous skin diseases.

We proceed as follows: To a solution of 10 kilos, by weight, of salicylic acid in 6.5 kilos, by weight, of soda-lye and 40 liters water, a solution of 3.65 kilos of iodine in 3.65 kilos, by weight, of alkaline iodide and 60 liters of water is added. The mixture is allowed to stand for some time, and is then made alkaline with soda-lye. A red precipitate results, which is filtered off and washed with clear water and dried at ordinary temperature.

This new product has the following characteristics: It represents a red-brown odorless powder, which is insoluble in water, alcohol, ether, and oil. If it is heated with mineral acids the color changes to a bright-red powder, which represents the free acid of the iodine substitution product of salicylic acid. It melts at about 225° centigrade, with decomposition, and is insoluble in alkalies.

Having thus described the nature of our invention and in that manner the same is to be performed, what we claim as new, and desire to secure by Letters Patent, is—

A red-brown odorless powder derived from iodine and salicylic acid, which is insoluble in water, alcohol, ether, and oil, changing to a bright-red powder by heating it with mineral acids and melting at about 225° centigrade, with decomposition, and being insoluble in alkalies, substantially as described.

In testimony whereof we have signed our names in the presence of two subscribing witnesses.

JOSEF MESSINGER.
GEORG VORTMANN.

Witnesses:
 JOHN HECKMANNS,
 ANDREW RINGRON.